(12) United States Patent
Ma et al.

(10) Patent No.: US 11,703,712 B2
(45) Date of Patent: Jul. 18, 2023

(54) DISPLAY MODULE, METHOD OF DRIVING SAME, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Qing Ma, Beijing (CN); Rui Han, Beijing (CN); Pengtao Li, Beijing (CN); Daekeun Yoon, Beijing (CN); Jie Yu, Beijing (CN); Weining Chi, Beijing (CN); Tianyang Han, Beijing (CN); Jing Yu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/569,199

(22) Filed: Jan. 5, 2022

(65) Prior Publication Data
US 2022/0236610 A1 Jul. 28, 2022

(30) Foreign Application Priority Data
Jan. 28, 2021 (CN) .......................... 202110120983.2

(51) Int. Cl.
*G02F 1/13357* (2006.01)
*G09G 3/36* (2006.01)
*H05B 45/37* (2020.01)

(52) U.S. Cl.
CPC .. *G02F 1/133603* (2013.01); *G02F 1/133606* (2013.01); *G09G 3/3648* (2013.01); *H05B 45/37* (2020.01); *G09G 2310/0264* (2013.01)

(58) Field of Classification Search
CPC ......... G02F 1/133603; G02F 1/133606; H05B 45/37; G09G 3/3648; G09G 2310/0264
See application file for complete search history.

(56) References Cited

U.S. PATENT DOCUMENTS

| 2007/0242459 A1 | 10/2007 | Nishigaki |
| 2009/0244885 A1 | 10/2009 | Watanabe et al. |
| 2018/0308412 A1* | 10/2018 | Wu ........................ H01L 27/124 |

(Continued)

FOREIGN PATENT DOCUMENTS

| CN | 101317036 A | 12/2008 |
| CN | 101739984 A | 6/2010 |

(Continued)

OTHER PUBLICATIONS

CN202110120983.2 first office action.

*Primary Examiner* — Kenneth B Lee, Jr.
(74) *Attorney, Agent, or Firm* — IPro, PLLC

(57) ABSTRACT

A display module is provided. In the display module, a liquid crystal display panel has a plurality of display subareas. A color backlight module has a plurality of backlight subareas in a one-to-one correspondence to the plurality of display subareas. A driving apparatus may sequentially drive liquid crystal molecules in the display subareas to turn over, and after driving the liquid crystal molecules in each display subarea to turn over, drive a light-emitting element of one color included in each backlight source in one corresponding backlight subarea to emit light.

19 Claims, 11 Drawing Sheets

(56) References Cited

U.S. PATENT DOCUMENTS

2020/0249526 A1\* 8/2020 Gu ...................... G02B 6/0028
2020/0355963 A1 11/2020 Liu et al.

FOREIGN PATENT DOCUMENTS

| CN | 102800294 | A | 11/2012 |
| CN | 103413529 | A | 11/2013 |
| CN | 206805079 | U | 12/2017 |
| CN | 108986752 | A | 12/2018 |
| CN | 111103723 | A | 5/2020 |
| JP | 2007322944 | A | 12/2007 |
| TW | 200935098 | A | 8/2009 |

\* cited by examiner

DISPLAY MODULE, METHOD OF DRIVING SAME, AND DISPLAY DEVICE

CROSS-REFERENCE TO RELATED APPLICATION

This application is based on and claims the priority to the Chinese patent application No. 202110120983.2, filed on Jan. 28, 2021 and entitled "DISPLAY DEVICE AND METHOD OF DRIVING SAME", the disclosure of which is herein incorporated by reference in its entirety.

TECHNICAL FIELD

The present disclosure relates to the field of display technologies, and in particular, relates to a display module, a method of driving the same, and a display device.

BACKGROUND

With the development of display technologies, a series of color-film-less liquid crystal display modules have emerged. The color-film-less liquid crystal display module refers to a display module which does not involve any color film but is provided with a color backlight module. It can be seen that the color-film-less liquid crystal display module generally realizes the color display by means of the color backlight module.

Currently, the color-film-less liquid crystal display module includes a driving apparatus, and a color backlight module and a liquid crystal display panel that are stacked in sequence. The driving apparatus can be configured to first drive, by means of a progressive scanning, liquid crystal molecules included in the liquid crystal display panel to turn over, and then turn on a backlight source included in the color backlight module, so as to realize the display.

SUMMARY

Embodiments of the present disclosure provide a display module, a method of driving the same, and a display device. The technical solutions are described as below.

In one aspect, a display module is provided, and the display module includes:

a color backlight module and a liquid crystal display module stacked in sequence, wherein the liquid crystal display module includes a liquid crystal display panel having a plurality of display subareas arranged along a column direction, and the color backlight module has a plurality of backlight subareas in a one-to-one correspondence to the plurality of display subareas and includes a plurality of backlight sources located in each of the backlight subareas, each of the backlight sources including light-emitting elements of N colors, N being a positive integer greater than 1; and a driving apparatus connected to the color backlight module and the liquid crystal display module respectively and configured to sequentially execute N driving processes in response to receiving data of one frame of image, wherein an $i^{th}$ driving process includes:

sequentially driving liquid crystal molecules in the display subareas to turn over, and after driving the liquid crystal molecules in each display subarea to turn over, driving a light-emitting element of an $i^{th}$ color included in each of the backlight sources in one backlight subarea corresponding to the display subarea as driven to emit light, i being a positive integer not greater than N.

Optionally, the driving apparatus is further configured to:

drive at least one light-emitting element of a different color than the $i^{th}$ color in each of the backlight sources to emit light in the $i^{th}$ driving process, wherein a luminance of the light-emitting element of the $i^{th}$ color is higher than a luminance of the at least one light-emitting element of the different color.

Optionally, the driving apparatus is further configured to:

drive each light-emitting element of a different color than the $i^{th}$ color in each of the backlight sources to emit light in the $i^{th}$ driving process, wherein a luminance of the light-emitting element of the $i^{th}$ color is higher than a luminance of each light-emitting element of the different color.

Optionally, each of the backlight sources includes a light-emitting element of a first color, a light-emitting element of a second color and a light-emitting element of a third color.

Optionally, the three light-emitting elements in each of the backlight sources are arranged in a triangle pattern, and any two adjacent light-emitting elements in each of the backlight subareas are of different colors.

Optionally, each of the backlight sources further includes a light-emitting element of a fourth color.

Optionally, the four light-emitting elements in each of the backlight source are arranged in a rectangle pattern, and any two adjacent light-emitting elements in each of the backlight subareas are of different colors.

Optionally, the first color is red, the second color is green, the third color is blue, and the fourth color is white.

Optionally, in a case that the $i^{th}$ color is not white, the driving apparatus is further configured to drive a white light-emitting element included in each of the backlight sources to emit light in the $i^{th}$ driving process.

Optionally, the display module further includes a plurality of reflective cups disposed between the liquid crystal display module and the color backlight module, wherein a cup bottom of each of the reflective cups is farther from the liquid crystal display module relative to a cup rim, and a size of the cup bottom is smaller than a size of the cup rim;

wherein an orthographic projection of each of the reflective cups onto the liquid crystal display module overlaps with an orthographic projection of at least one of the backlight sources onto the liquid crystal display module.

Optionally, the display module further includes:

a gain film disposed on a side of the plurality of reflective cups distal from the backlight sources; and a fog screen disposed on a side of the gain film distal from the plurality of reflective cups.

Optionally, the driving apparatus includes a processing circuit, a control circuit, a backlight driving circuit and a power supply circuit, and the liquid crystal display module further includes a display panel driving circuit;

the processing circuit is respectively connected to the display panel driving circuit and the control circuit, and configured to receive image data and to transmit an initial driving signal to the display panel driving circuit and the control circuit based on the image data;

the display panel driving circuit is further connected to the liquid crystal display panel and configured to drive the liquid crystal molecules included in the liquid crystal display panel to turn over under a control of the initial driving signal;

the control circuit is further connected to the backlight driving circuit and configured to transmit a backlight driving signal to the backlight driving circuit under the control of the initial driving signal;

the backlight driving circuit is further connected to the color backlight module and configured to drive the backlight sources included in the color backlight module to emit light under a control of the backlight driving signal; and the power supply circuit is connected to the color backlight module and configured to power the color backlight module.

Optionally, the control circuit includes a micro control unit MCU.

Optionally, the color backlight module is a direct-type backlight module.

Optionally, an equal number of backlight sources are provided in each of the backlight subareas.

Optionally, the display module is a color-film-less head-up display module.

Optionally, the liquid crystal display panel includes a plurality of pixels, and a number of the plurality of pixels is greater than a number of the backlight sources included in the color backlight module.

In another aspect, a method of driving a display module is provided. The display module includes: a color backlight module and a liquid crystal display module stacked in sequence, wherein the liquid crystal display module includes a liquid crystal display panel having a plurality of display subareas arranged along a column direction, and the color backlight module has a plurality of backlight subareas in a one-to-one correspondence to the plurality of display subareas and includes a plurality of backlight sources located in each of the backlight subareas, each of the backlight sources including light-emitting elements of N colors, N being a positive integer greater than 1; and a driving apparatus connected to the color backlight module and the liquid crystal display module respectively, and the method including:

receiving data of one frame of image;

sequentially executing N driving processes in response to the data of the frame of image, wherein an $i^{th}$ driving process includes: sequentially driving liquid crystal molecules in the display subareas to turn over, and after driving the liquid crystal molecules in each display subarea to turn over, driving a light-emitting element of an $i^{th}$ color included in each of the backlight sources in one backlight subarea corresponding to the display subarea as driven to emit light, i being a positive integer not greater than N.

In yet another aspect, a display device is provided, and the display device includes a power supply component and a display module; the power supply component is connected to the display module and configured to power the display module; and the display module includes:

a color backlight module and a liquid crystal display module stacked in sequence, wherein the liquid crystal display module includes a liquid crystal display panel having a plurality of display subareas arranged along a column direction, and the color backlight module has a plurality of backlight subareas in a one-to-one correspondence to the plurality of display subareas and includes a plurality of backlight sources located in each of the backlight subareas, each of the backlight sources including light-emitting elements of N colors, N being a positive integer greater than 1; and a driving apparatus connected to the color backlight module and the liquid crystal display module respectively and configured to sequentially execute N driving processes in response to receiving data of one frame of image, wherein an ith driving process includes:

sequentially driving liquid crystal molecules in the display subareas to turn over, and after driving the liquid crystal molecules in each display subarea to turn over, driving a light-emitting element of an ith color included in each of the backlight sources in one backlight subarea corresponding to the display subarea as driven to emit light, i being a positive integer not greater than N.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the purposes, technical solutions and advantages of the present disclosure clearer, the following further describes the embodiments of the present disclosure in detail with reference to the accompanying drawings.

Color-film-less display panels are widely used in various display modules because they can realize color display without needing to dispose a color film. A display module equipped with the color-film-less display panel may be referred to as a color-film-less display module. Currently, compared with a conventional display module (i.e., a display module with color films), the color-film-less display module not only has a high resolution, but also has a low heat generation and a low power consumption. However, the inventors have discovered that the current color-film-less display modules are low in luminance and have serious color crosstalk.

Embodiments of the present disclosure provide a display module, which not only can be implemented as a color-film-less display module but also can avoid or alleviate the color crosstalk, and can achieve a high display luminance and excellent display effect.

Figure 1:
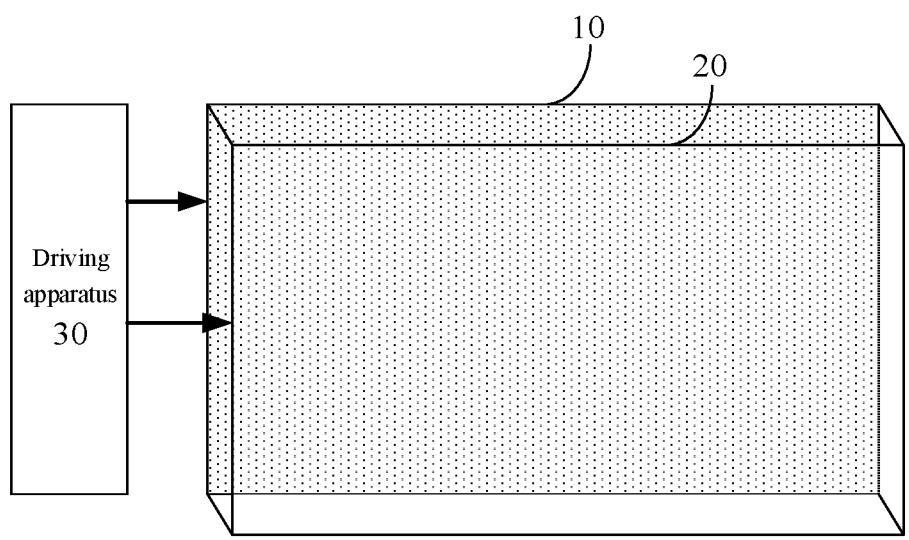
FIG. 1 is a schematic structural diagram of a display module according to an embodiment of the present disclosure.

FIG. 1 is a schematic structural diagram of a display module according to an embodiment of the present disclosure. As shown in FIG. 1, the display module may include a color backlight module 10 and a liquid crystal display module 20 stacked in sequence. The liquid crystal display module 20 may include a liquid crystal display panel, and the liquid crystal display panel may include a plurality of pixels arranged in an array. Each pixel may at least include a pixel electrode, a common electrode and a plurality of liquid crystal molecules, and the plurality of liquid crystal molecules may be turned over under the action of a voltage difference between the pixel electrode and the common electrode.

In an embodiment of the present disclosure, the liquid crystal display panel may have a plurality of display subareas arranged along a column direction. The color backlight module 10 may have a plurality of backlight subareas in a one-to-one correspondence to the plurality of display subareas. Furthermore, the color backlight module 10 may include a plurality of backlight sources 101 located in each backlight subarea, and each backlight source 101 may include light-emitting elements L1 of N colors, where N may be a positive integer greater than 1. Each light-emitting element L1 is configured to emit light of a single color.

Figure 2:
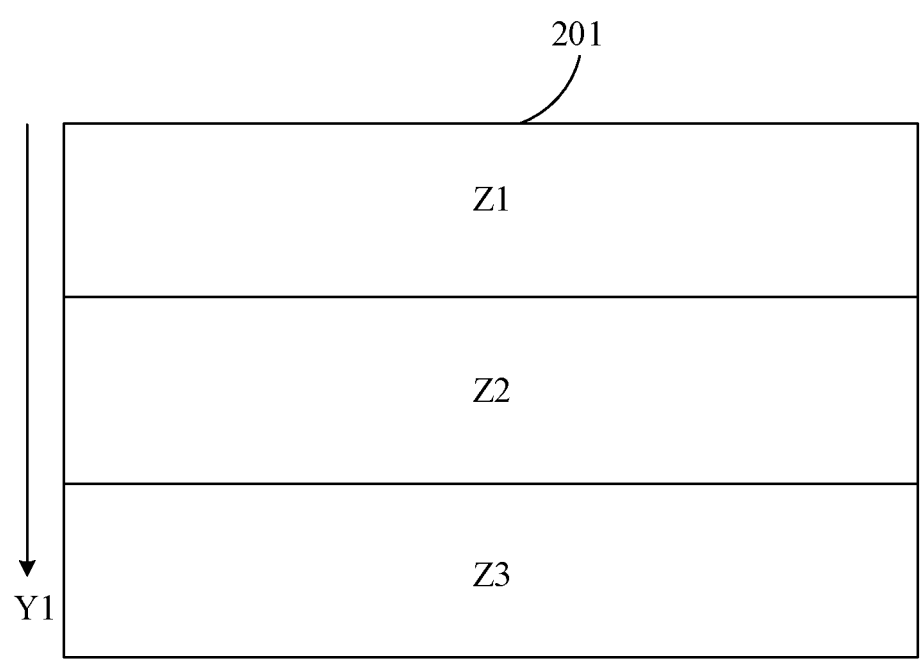
FIG. 2 is a schematic structural diagram of a liquid crystal display panel according to an embodiment of the present disclosure.

For example, a liquid crystal display panel 201 shown in FIG. 2 has three display subareas Z1, Z2 and Z3 arranged along a column direction Y1. The color backlight module 10 shown in FIG. 3 has three backlight subareas M1, M2 and M3. Referring to all of FIGS. 1 to 3, the backlight subarea M1 may correspond to the display subarea Z1, the backlight subarea M2 may correspond to the display subarea Z2, and the backlight subarea M3 may correspond to the display subarea Z3. Furthermore, in the color backlight module 10 shown in FIG. 3, each backlight source 101 includes three light-emitting elements L1 each having a different color, i.e., each backlight source 101 includes three light-emitting elements L1, and the three light-emitting elements L1 are of different colors. For example, referring to FIG. 3, in each backlight source 101, the color of the light-emitting element L1 on the left may be red (R), the color of the light-emitting element L1 in the middle may be green (G), and the color of the light-emitting element L1 on the right may be blue (B).

It should be noted that the number of pixels included in the liquid crystal display panel 201 may be different from the number of the backlight sources 101 included in the color backlight module 10. Generally, the number of the backlight sources 101 included in the color backlight module 10 is far less than the number of the pixels included in the liquid crystal display panel 201. That is, one backlight source 101 may provide color backlight for a plurality of pixels. In this way, it can be seen that the display module described in the embodiments of the present disclosure can realize color display without the need of disposing the color film.

Continuously referring to FIG. 1, the display module described in the embodiments of the present disclosure may further include a driving apparatus 30, which may be connected to the color backlight module 10 and the liquid crystal display module 20 respectively. The driving apparatus 30 may be configured to receive data of an image, and may sequentially execute N driving processes based on or in response to data of one frame of the image as received. Here, an $i^{th}$ driving process may include:

sequentially driving the liquid crystal molecules in the display subareas to turn over, and after driving the liquid crystal molecules in each display subarea to turn over, driving a light-emitting element L1 of an $i^{th}$ color included in each backlight source 101 in one backlight subarea corresponding to the display subarea to emit light, where i may be a positive integer not greater than N. Here, by sequentially driving the liquid crystal molecules in the display subareas to turn over, it means that the liquid crystal molecules in a first display subarea are driven to turn over, then the liquid crystal molecules in a second display subarea are driven to turn over, then the liquid crystal molecules in a third display subarea are driven to turn over, and so on.

It can be known from the descriptions of the foregoing embodiments that the action of driving the liquid crystal molecules to turn over is performed under the premise of charging the pixel electrode of the pixel to which the liquid crystal molecules belong. That is, the driving apparatus 30 may be configured to sequentially charge (optionally, through a progressive scanning) the pixels in each display subarea, to drive the liquid crystal molecules in each display subarea to turn over.

Figure 3:
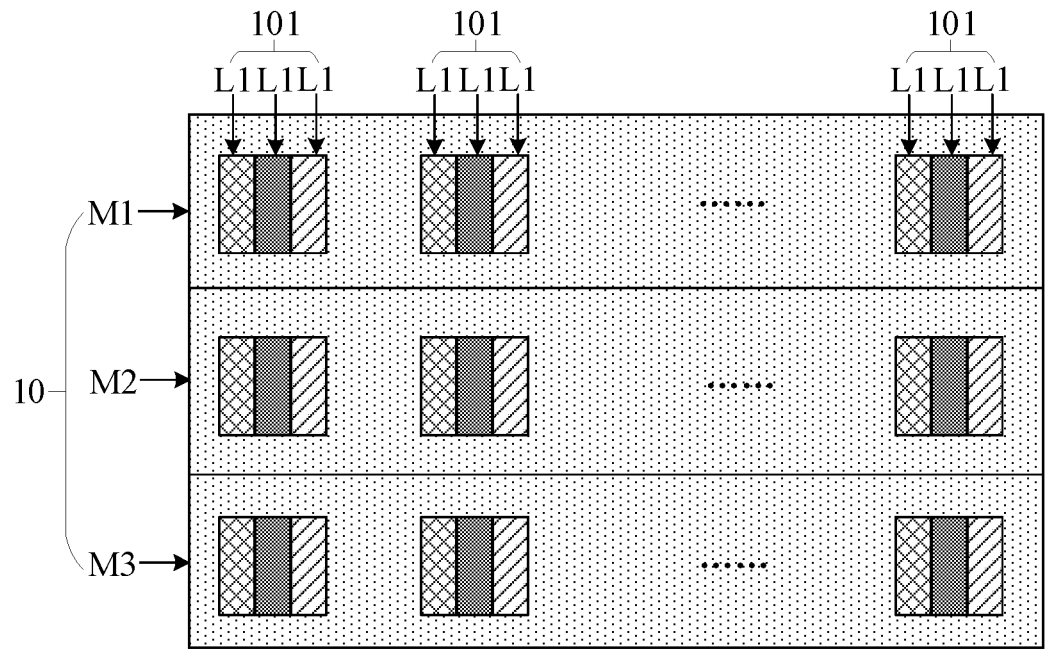
FIG. 3 is a schematic structural diagram of a color backlight module according to an embodiment of the present disclosure.

Exemplarily, referring to the color backlight module 10 shown in FIG. 3, each backlight source 101 may include three light-emitting elements L1 having the color of red, green or blue, respectively, i.e., N is equal to 3. Then, with reference to the time sequence diagram shown in FIG. 4, the driving apparatus 30 may sequentially execute three driving processes T1, T2 and T3 upon receiving data of one frame of image.

Here, the first driving process T1 may include: (1) charging the pixel electrode of each pixel in the first display subarea Z1 to drive the liquid crystal molecules in the first display subarea Z1 to turn over, and after the liquid crystal molecules in the first display subarea Z1 are turned over, driving a light-emitting element L1 of a first color included in each backlight source 101 in the first backlight subarea M1 corresponding to the first display subarea Z1 to emit light; (2) charging the pixel electrode of each pixel in the second display subarea Z2 to drive the liquid crystal molecules in the second display subarea Z2 to turn over, and after the liquid crystal molecules in the second display subarea Z2 are turned over, driving a light-emitting element L1 of a first color included in each backlight source 101 in the second backlight subarea M2 corresponding to the second display subarea Z2 to emit light; and (3) charging the pixel electrode of each pixel in the third display subarea Z3 to drive the liquid crystal molecules in the third display subarea Z3 to turn over, and after the liquid crystal molecules in the third display subarea Z3 are turned over, driving a light-emitting element L1 of a first color included in each backlight source 101 in the third backlight subarea M3 corresponding to the third display subarea Z3 to emit light. Therefore, in the first driving process T1, the light-emitting elements L1 of the first color (e.g., the red (R) color) in all the backlight sources 101 included in the color backlight module 10 are turned on. Still referring to the time sequence diagram shown in FIG. 4, similarly, in the second driving process T2, all the light-emitting elements L1 of a second color (e.g., the green (G) color) included in the respective backlight sources 101 are driven to emit light; and similarly, in the third driving process T3, all the light-emitting element L1 of a third color (e.g., the blue (B) color) included in the respective backlight sources 101 are driven to emit light.

Upon completion of the above three driving processes, the display module may successfully display the one frame of image. In this way, one driving process may also be referred to as a monochrome-frame scanning time (or, a monochrome-frame charge), and the N driving processes may be collectively referred to as one image (one frame of image) scanning time (or, an image charge). That is, one frame of image would be equal to a superposition or combination of several monochrome-frames. In addition, in the time sequence diagram shown in FIG. 4, $T_{CT}$ indicates a time period for charging the pixel electrode, $T_{LT}$ indicates a time period for the liquid crystal molecules to turn over, and $T_{BT}$ indicates a time period for a light-emitting element L1 to emit light. Moreover, the high potential represents charging the pixel electrode and driving the light-emitting element L1 to emit light, and the low potential represents that the charging of the pixel electrode is completed and the liquid crystal molecules are being turned over. The high potential is greater than the low potential.

Figure 4:
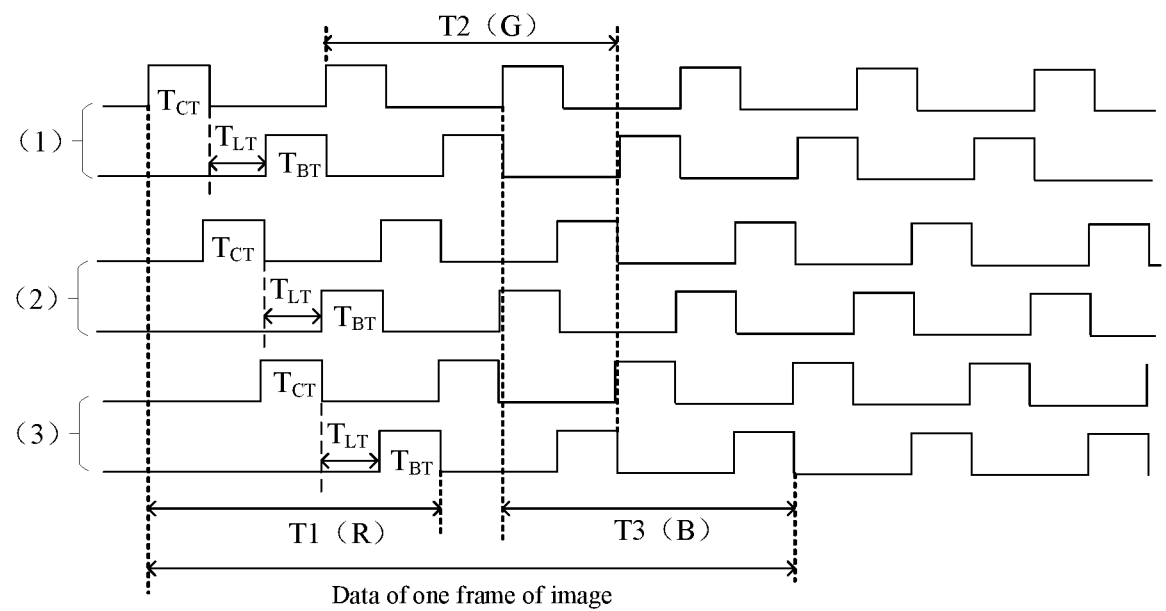
FIG. 4 is a driving time sequence diagram according to an embodiment of the present disclosure.

Besides, combining the time sequence diagram shown in FIG. 4, it can be known that the display luminance Lu of one frame of image may meet the following equation:

$$Lu = Lr0 * T_{BT} + Lg0 * T_{BT} + Lb0 * T_{BT},$$

where Lr0 indicates the luminance of the red light-emitting element L1, Lg0 indicates the luminance of the green light-emitting element L1, and Lb0 indicates the luminance of the blue light-emitting element L1.

In view of the descriptions of the foregoing embodiments, it can be determined that through the partitioning of the driving processes, charging of the pixel electrodes included in the pixels can be accelerated (i.e., $T_{CT}$ is reduced), and then a time period for turning over the liquid crystal molecules can be prolonged (i.e., $T_{BT}$ is increased), so as to ensure that the liquid crystal molecules can be turned over reliably and successfully prior to turning on the backlight sources. In this way, the color crosstalk challenge due to the liquid crystal molecules being incapable of turning over timely in the related art can be effectively solved or alleviated. In addition, by individually controlling the respective light-emitting elements L1 of different colors to emit light, an excellent display effect can be further guaranteed.

In summary, the embodiments of the present disclosure provides a display module which includes a color backlight module, a liquid crystal display panel and a driving apparatus. The liquid crystal display panel has a plurality of display subareas arranged along a column direction, and the color backlight module has a plurality of backlight subareas in a one-to-one correspondence to the plurality of display subareas and includes a plurality of backlight sources. As the driving apparatus is configured to sequentially drive liquid crystal molecules in the display subareas to turn over, and each time the liquid crystal molecules in each display subarea have been turned over, the driving apparatus is further configured to drive the light-emitting element of one color included in each backlight source in one corresponding backlight subarea to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

Figure 5:
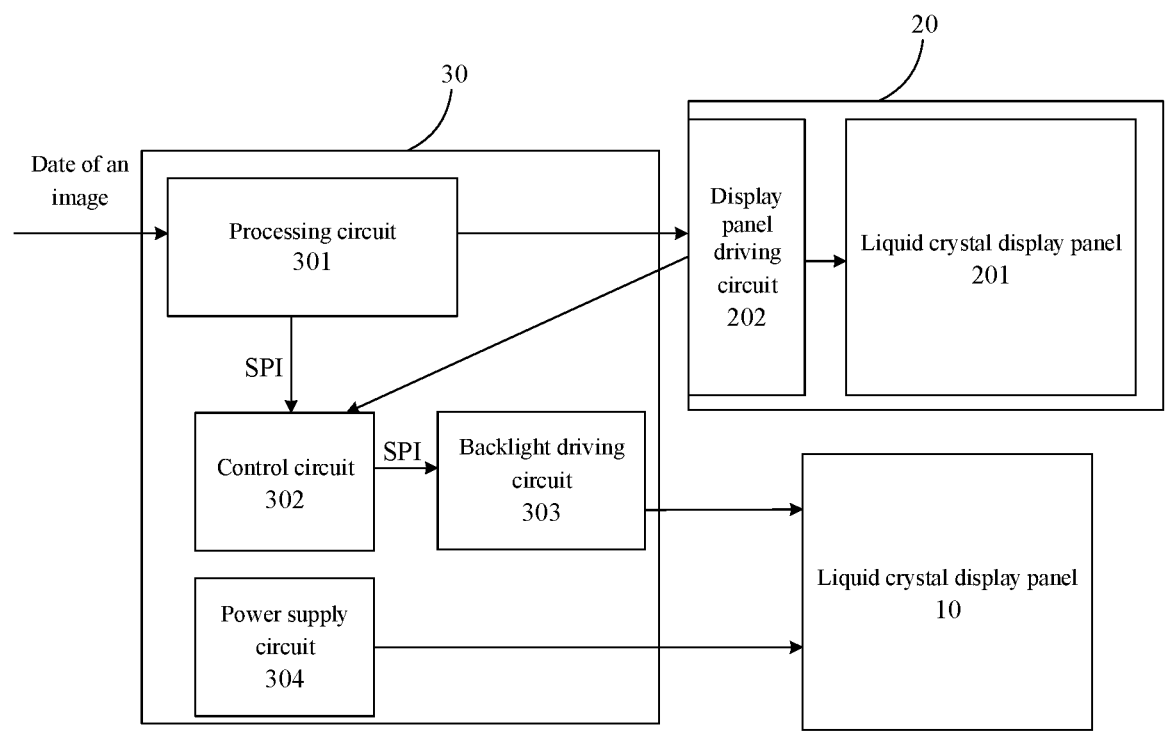
FIG. 5 is a schematic structural diagram of another display module according to an embodiment of the present disclosure.

FIG. 5 is a schematic structural diagram of another display module according to an embodiment of the present disclosure. As shown in FIG. 5, the driving apparatus 30 may include a processing circuit 301, a control circuit 302, a backlight driving circuit 303 and a power supply circuit 304. The liquid crystal display module 20 may further include a display panel driving circuit 202.

Here, the processing circuit 301 may be connected to the display panel driving circuit 202 and the control circuit 302 respectively and configured to receive image data, i.e., image signal(s), and may transmit one or more initial driving signal(s) to the display panel driving circuit 202 and the control circuit 302 based on the image data.

For example, referring to FIG. 5, the processing circuit 301 may be connected to the control circuit 302 by a serial peripheral interface (SPI). The display panel driving circuit 202 may further be connected to the control circuit 302. The processing circuit 301 may process the received image data into a field sequence signal corresponding to the light-emitting elements of different colors, and transmit an initial driving signal carrying the field sequence signal to the display panel driving circuit 202. Then, the display panel driving circuit 202 transmits an initial driving signal including a frame starting signal to the control circuit 302. Alternatively, the processing circuit 301 may directly transmit the initial driving signal to the control circuit 302. The control circuit 302 may start to work under the control of the initial driving signal, e.g., start to drive the connected circuits to work.

The display panel driving circuit 202 may further be connected to the liquid crystal display panel 201. The display panel driving circuit 202 may be configured to drive the liquid crystal molecules included in the liquid crystal display panel 201 to turn over under the control of the initial driving signal.

For example, the display panel driving circuit 202 may charge the pixel electrode of each pixel included in the liquid crystal display panel 201 under the control of the initial driving signal. Therefore, the liquid crystal molecules may be turned over under the driving of the voltage difference between the pixel electrode and the common electrode.

The control circuit 302 may further be connected to the backlight driving circuit 303 and configured to transmit a backlight driving signal to the backlight driving circuit 303 under the control of the initial driving signal.

The backlight driving circuit 303 may further be connected to the color backlight module 10 and configured to drive the backlight sources 101 included in the color backlight module 10 to emit light under the control of the backlight driving signal.

For example, referring to FIG. 5, the control circuit 302 may be connected to the backlight driving circuit 303 via the SPI. Upon receiving the initial driving signal, the control circuit 302 may start to control the backlight driving circuit 303 to drive, according to a specified time sequence, the backlight sources in the color backlight module 10 to emit light. The control principle is to identify a frame/row signal carried by the initial driving signal and to control the backlight driving circuit 303 to turn on the light-emitting elements L1 of different colors.

Optionally, the specified time sequence may be preset in the control circuit 302. For example, the specified time sequence may be the time sequence shown in FIG. 4.

The power supply circuit 304 may be connected to the color backlight module 10 and configured to power the color backlight module 10.

Optionally, the processing circuit 301 may also be referred to as a processing system. The control circuit 302 may be a micro control unit (MCU). The light-emitting elements L1 described in the embodiments of the present disclosure may be light emitting diodes (LEDs), and correspondingly, the backlight driving circuit 303 may also be referred to as an LED driver integrated circuit (LED driver IC). The power supply circuit 304 may include a direct current (DC)-DC converter. The display panel driving circuit 202 may be a driver IC.

Optionally, the driving apparatus 30 including the above circuits may be disposed independently of the liquid crystal display module 20. The display panel driving circuit 202 and the liquid crystal display panel 201 may be integrated together. In this way, the driving apparatus 30 may also be referred to as a driving system.

Optionally, with reference to FIG. 3, each backlight source 101 described in the embodiments of the present disclosure may include a light-emitting element L1 of a first color, a light-emitting element L1 of a second color and a light-emitting element L1 of a third color.

Figure 6:
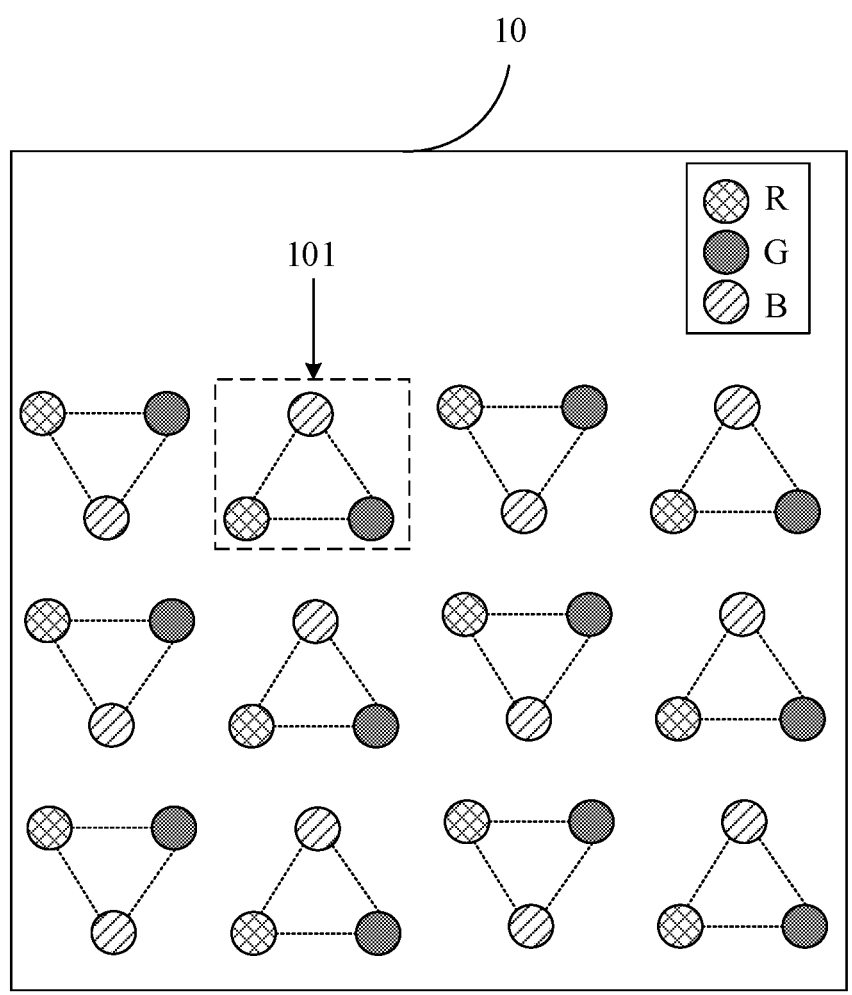
FIG. 6 is an optional structural diagram of a backlight source according to an embodiment of the present disclosure.

Optionally, it can be seen based on FIG. 3 by combining the structural diagram of the backlight sources shown in FIG. 6 that the three light-emitting elements L1 in each backlight source 101 may be arranged in a triangle pattern. In addition, in each backlight subarea, any two adjacent light-emitting elements L1 may be of different colors. In this way, the color crosstalk challenge may be further avoided or alleviated.

Figure 7:
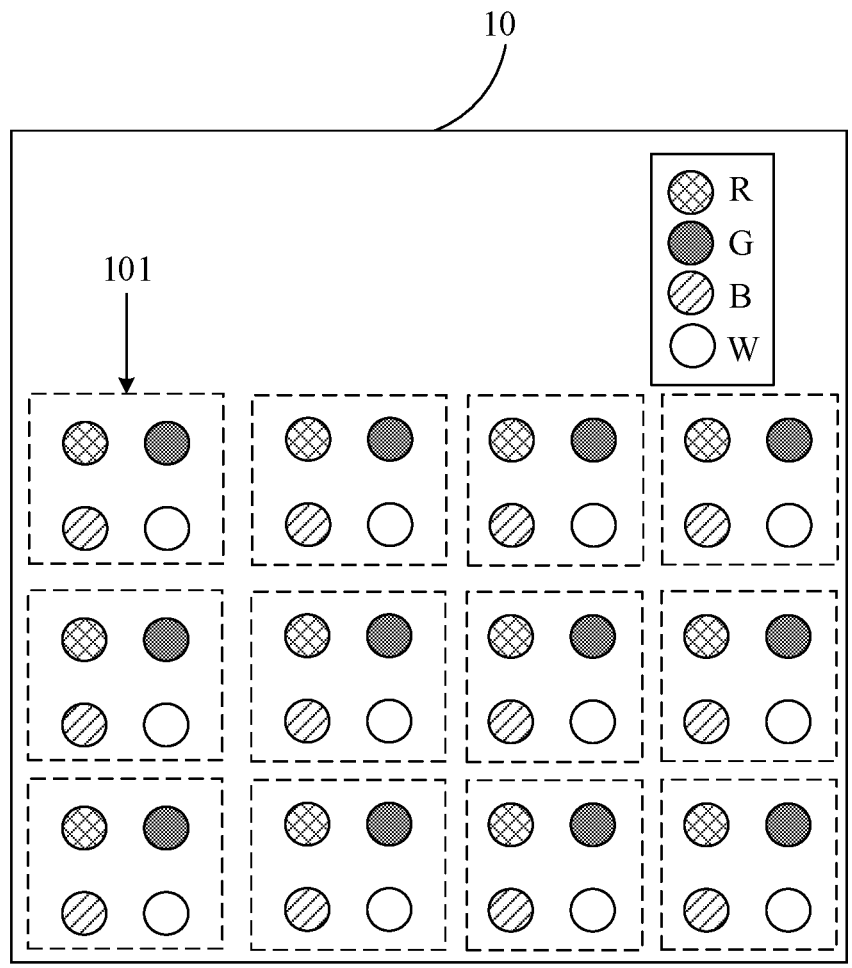
FIG. 7 is an optional structural diagram of another backlight source according to an embodiment of the present disclosure.

Optionally, with reference to the backlight sources shown in FIG. 7, each backlight source 101 described in the embodiments of the present disclosure may further include a light-emitting element L1 of a fourth color.

Optionally, still referring to FIG. 7, the four light-emitting elements L1 in each backlight source 101 may be arranged in a rectangle pattern. In addition, in each backlight subarea, any two adjacent light-emitting elements L1 are of different colors.

Optionally, the first color may be red, the second color may be green, the third color may be blue, and the fourth color may be white (W). The addition of the white light-emitting element L1 can improve the overall light efficiency of the backlight sources 101.

In some embodiments, for the structure shown in FIG. 6, the three light-emitting elements L1 included in each backlight source 101 may also be arranged in other patterns, e.g., a circle pattern. For the structure shown in FIG. 7, the four light-emitting elements L1 included in each backlight source 101 may also be arranged in other patterns, e.g., a trapezoid pattern.

Figure 8:
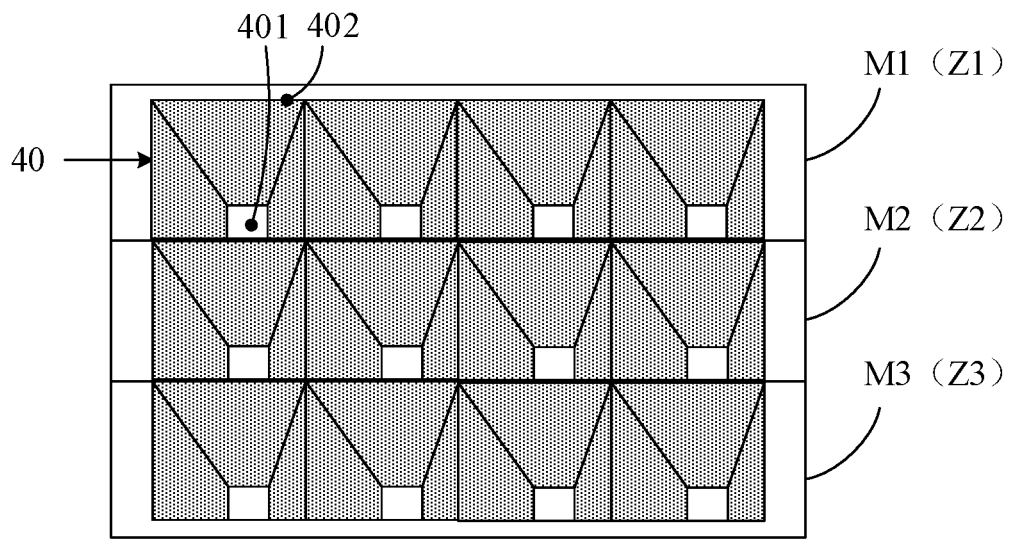
FIG. 8 is a schematic diagram of a display module including reflective cups according to an embodiment of the present disclosure.

Optionally, referring to FIG. 8, the display module described in the embodiments of the present disclosure may further include a plurality of reflective cups 40 disposed between the liquid crystal display module 20 and the color backlight module 10.

As compared with the distance between the cup rim 402 of each reflective cup 40 from the liquid crystal display module 20, the distance between the cup bottom 401 of each reflective cup 40 and the liquid crystal display module 20 may be longer, and the size of the cup bottom 401 may be smaller than the size of the cup rim 402. An orthographic projection of each reflective cup 40 onto the liquid crystal display module 20 may overlap with an orthographic projection of at least one backlight source 101 onto the liquid crystal display module 20.

For example, the display module shown in FIG. 8 includes 16 reflective cups 40 disposed between the liquid crystal display module 20 and the color backlight module 10, and each display subarea is correspondingly provided with four reflective cups 40.

Figure 9:
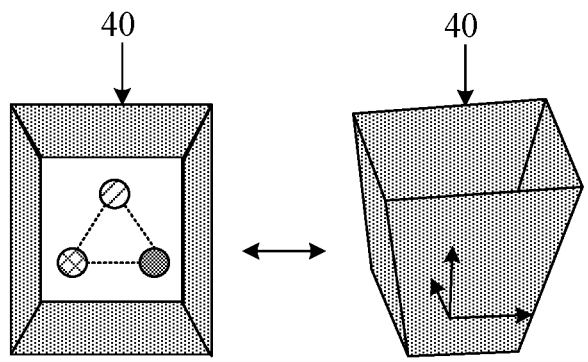
FIG. 9 is a schematic structural diagram of a reflective cup and a backlight source according to an embodiment of the present disclosure.
Figure 10:
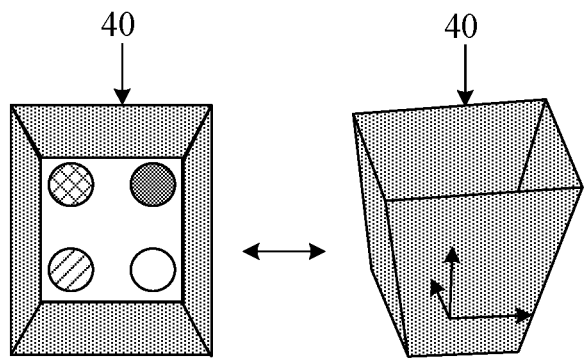
FIG. 10 is a schematic structural diagram of another arrangement of a reflective cup and a backlight source according to an embodiment of the present disclosure.

In another example, by taking the backlight sources 101 shown in FIG. 6 as an example, FIG. 9 shows a schematic diagram of a positional relationship between a reflective cup 40 and a backlight source 101, and also shows a corresponding 3-dimensional (D) sectional view. By taking the backlight sources 101 shown in FIG. 7 as an example, FIG. 10 shows a schematic diagram of another positional relationship between a reflective cup 40 and a backlight source 101, and also shows a corresponding 3D sectional view. In the 3D cross-sectional views shown in FIGS. 9 and 10, arrows in the reflective cups 40 indicate the light-emitting directions of the light-emitting elements L1. As such, the display effect can be further improved by additionally providing the reflective cups 40.

Figure 11:
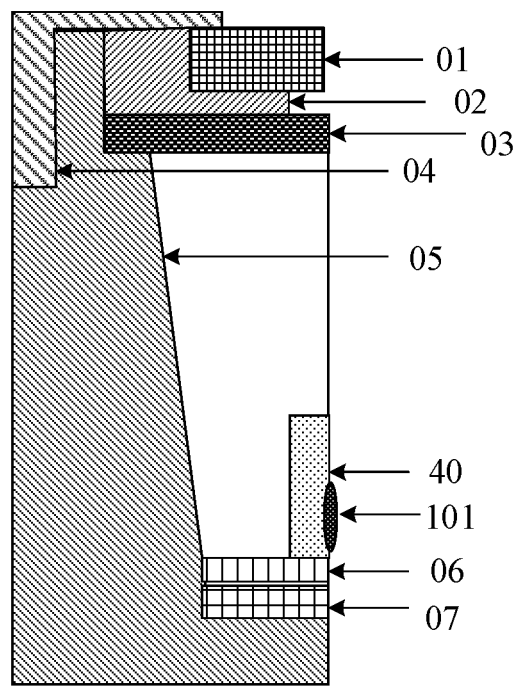
FIG. 11 is a schematic sectional view of a display module according to an embodiment of the present disclosure.

In an example, FIG. 11 shows a schematic sectional view of a display module including both the liquid crystal display module 20 and the color backlight module 10. As shown in FIG. 11, the display module may include a substrate 01 that may be a color-film-less glass substrate; a foam frame 02 for support and fixation; a diffuser plate 03 that may be configured to prevent a lamp shadow (it is unnecessary to dispose the diffuser plate 03 if the reflective cup 40 can effectively improve the display effect); a bezel 04 configured to embed and fix glass; a back cover 05 that is a major backlight structure; a reflective cup 40 that may be configured to realize the collimation of the backlight; an LED that is the backlight source 101; an LED power lead 06; and a thermal tape 07.

Optionally, according to the above descriptions of the display module, it can be known that in the embodiments of the present disclosure, the color backlight module 10 may be a direct-type backlight module, which can further improve the display effect.

In some other embodiments, the color backlight module 10 may otherwise be a side-type backlight module.

Optionally, with reference to FIGS. 2 and 3, an equal number of backlight sources 101 may be provided in each backlight subarea described in the embodiments of the present disclosure. In other words, each display subarea includes an equal number of pixels, which can further improve the display effect.

Optionally, in some embodiments of the present disclosure, the driving apparatus 30 may further be configured to drive, in the $i^{th}$ driving process, at least one light-emitting element L1 of a different color than the $i^{th}$ color in each backlight source 101 to emit light. Or, the driving apparatus 30 may further be configured to drive, in the $i^{th}$ driving process, each light-emitting element L1 of a different color than the $i^{th}$ color in each backlight source 101 to emit light.

That is, when light-emitting elements L1 of at least one color are driven to emit light, light-emitting elements L1 of one or more different colors than the at least one color are also driven to emit light at the same time.

Here, the luminance of the light-emitting elements L1 of the $i^{th}$ color may be higher than the luminance of each of the light-emitting elements L1 of other colors which are turned on at the same time. In this way, the display luminance can be improved while the color crosstalk is avoided, which further improves the display effect of the display module.

Figure 12:
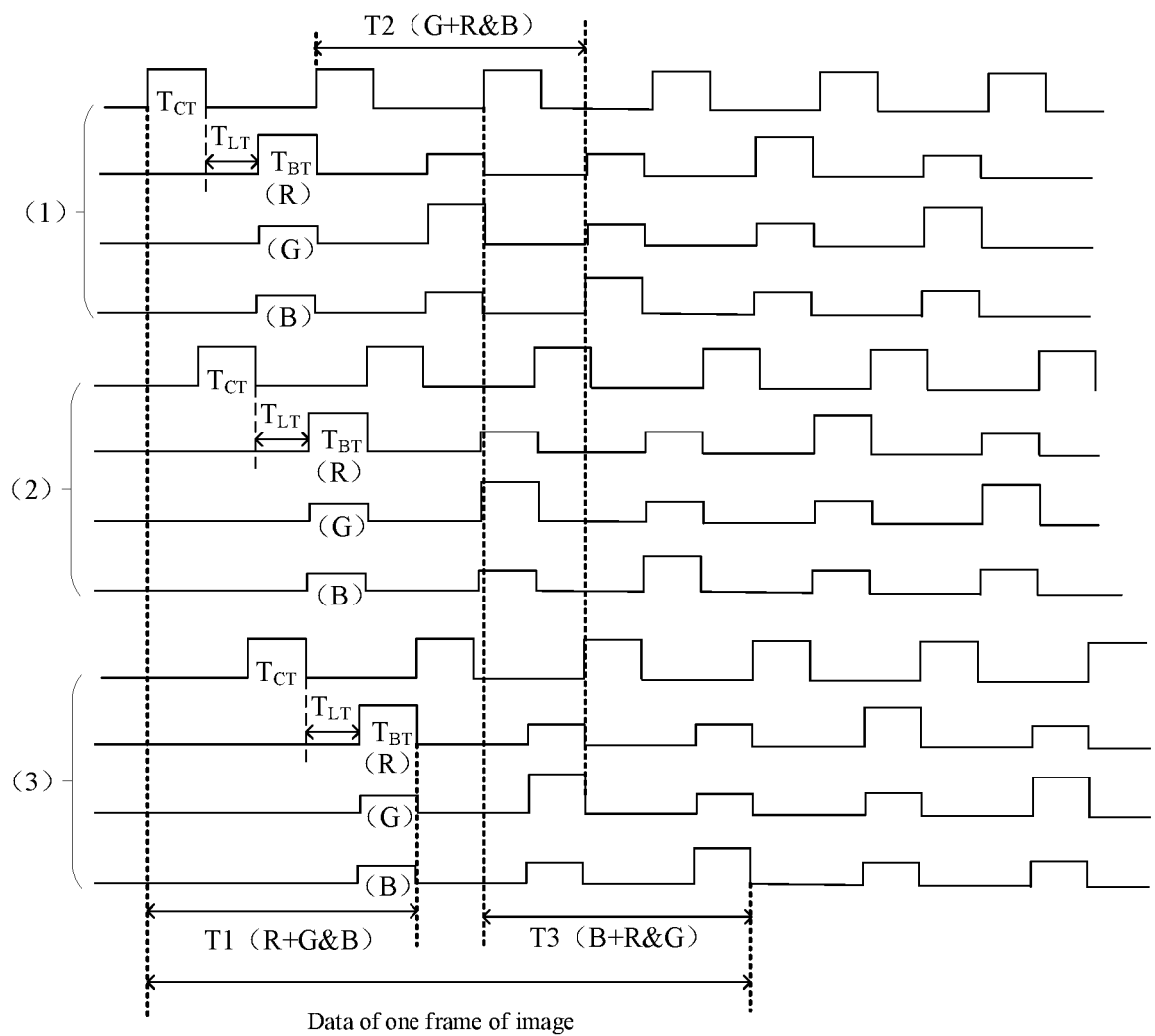
FIG. 12 is another driving time sequence diagram according to an embodiment of the present disclosure.

An example is provided by taking the display module shown in FIG. 6 as an example, where the first color is red, the second color is green, and the third color is blue; and in the $i^{th}$ driving process, each light-emitting element L1 of a different color than the $i^{th}$ color in each backlight source 101 is driven to emit light. FIG. 12 shows another driving time sequence diagram for this example.

As shown in FIG. 12, the driving apparatus 30 may sequentially execute three driving processes T1, T2 and T3 after receiving data of one frame of image. It is assumed that the light-emitting elements L1 of the first color driven by the driving apparatus 30 in the first driving process T1 are red light-emitting elements, the light-emitting elements L1 of the second color driven by the driving apparatus 30 in the second driving process T2 are green light-emitting elements, and the light-emitting elements L1 of the third color driven by the driving apparatus 30 in the third driving process T3 are blue light-emitting elements. Referring to FIG. 12, in the first driving process T1, when driving the red light-emitting elements L1 included in the respective backlight sources 101 to emit light, the driving apparatus 30 may simultaneously drive the green light-emitting elements L1 and the blue light-emitting elements L1 included in the respective backlight sources 101 to emit light. In the second driving process T2, when driving the green light-emitting elements L1 included in the respective backlight sources 101 to emit light, the driving apparatus 30 may simultaneously drive the red light-emitting elements L1 and the blue light-emitting elements L1 included in the respective backlight sources 101 to emit light. In the third driving process T3, when driving the blue light-emitting elements L1 included in the respective backlight sources 101 to emit light, the driving apparatus may simultaneously drive the red light-emitting elements L1 and the green light-emitting elements L1 included in the respective backlight sources 101 to emit light. That is, the green and blue colors are also added to the R picture, the red and blue colors are also added to the G picture, and the red and green colors are also added to the B picture.

It should be noted that the luminance of the light-emitting element L1 may be positively correlated to the magnitude of a potential transmitted by the driving apparatus 30. That is, the higher the potential is, the higher the luminance is; and the lower the potential is, the lower the luminance is. Thus, it can be seen from FIG. 12 that in the first driving process T1, the potential transmitted by the driving apparatus 30 to the red light-emitting element L1 is greater than the potential transmitted by the driving apparatus 30 to the green light-emitting element L1 and is greater than the potential transmitted by the driving apparatus 30 to the blue light-emitting element L1. In this way, it is ensured that the luminance of the red light-emitting element L1 is higher than the luminance of the green light-emitting element L1 and the luminance of the blue light-emitting element L1 in the first driving process T1. The second driving process T2 and the third driving process T3 are similar to the first driving process T1, and these processes are not repeated here.

Therefore, it can be determined from the time sequence diagram shown in FIG. 12 that the display luminance Lu of one frame of image may meet the following equation:

$$Lu=(Lr1*T_{BT}+Lg1*T_{BT}+Lb1*T_{BT})+(Lr2*2*T_{BT}+Lg2*2*T_{BT}+Lb2*2*T_{BT})=Lr1*T_{BT}+Lr2*2*T_{BT}+Lg1*T_{BT}+Lg2*2*T_{BT}+Lb1*T_{BT}+Lb2*2*T_{BT},$$

in which Lr1 indicates the luminance of the red light-emitting element L1; Lr2 indicates the luminance of the red light-emitting element L1 in the case that the green light-emitting element L1 and the blue light-emitting element L1 are also driven to emit light when the red light-emitting element L1 is driven to emit light; Lg1 indicates the luminance of the green light-emitting element L1; Lg2 indicates the luminance of the green light-emitting element L1 in the case that the red light-emitting element L1 and the blue light-emitting element L1 are also driven to emit light when the green light-emitting element L1 is driven to emit light; Lb1 indicates the luminance of the blue light-emitting element L1; Lb2 indicates the luminance of the blue light-emitting element L1 in the case that the red light-emitting element L1 and the green light-emitting element L1 are also driven to emit light when the blue light-emitting element L1 is driven to emit light; $Lr1*T_{BT}+Lg1*T_{BT}+Lb1*T_{BT}$ indicates the display luminance of one frame of image corresponding to the time sequence diagram shown in FIG. 4; and $Lr2*2*T_{BT}+Lg2*2*T_{BT}+Lb2*2*T_{BT}$ indicates the newly added display luminance corresponding to the turned-on light-emitting elements L1 of various other colors. Therefore, it can be determined that the display luminance can be effectively improved by performing the driving and displaying according to the time sequence diagram shown in FIG. 12.

Figure 13:
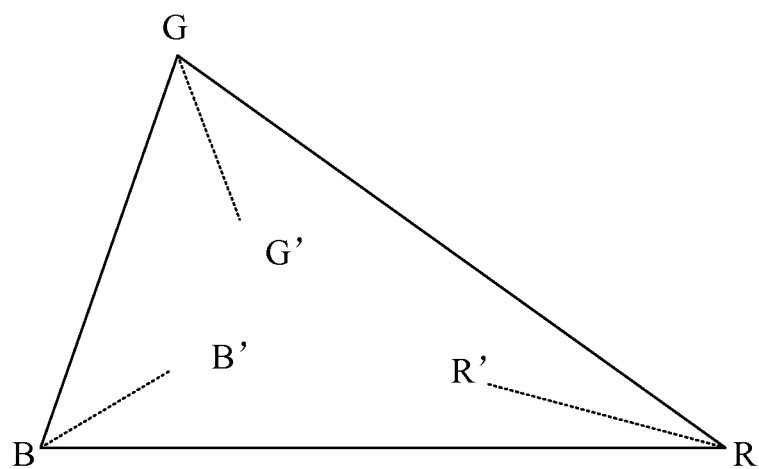
FIG. 13 is a schematic diagram of color coordinates according to an embodiment of the present disclosure.

In addition, it can be seen from the above equation that if Lr1:Lg1:Lb1=Lr2:Lg2:Lb2, the color coordinates of the white-points can be kept unchanged. FIG. 13 shows a schematic diagram of color coordinates, wherein the R, G and B are color coordinates of the corresponding colors in the time sequence diagram shown in FIG. 4. The R', G' and B' are the color coordinates of the corresponding colors in the time sequence diagram shown in FIG. 12. It can be further determined from FIG. 13 that the color coordinates of the three light-emitting elements L1 of the red, green and blue colors can be changed without changing the color coordinates of the white-points.

Figure 14:
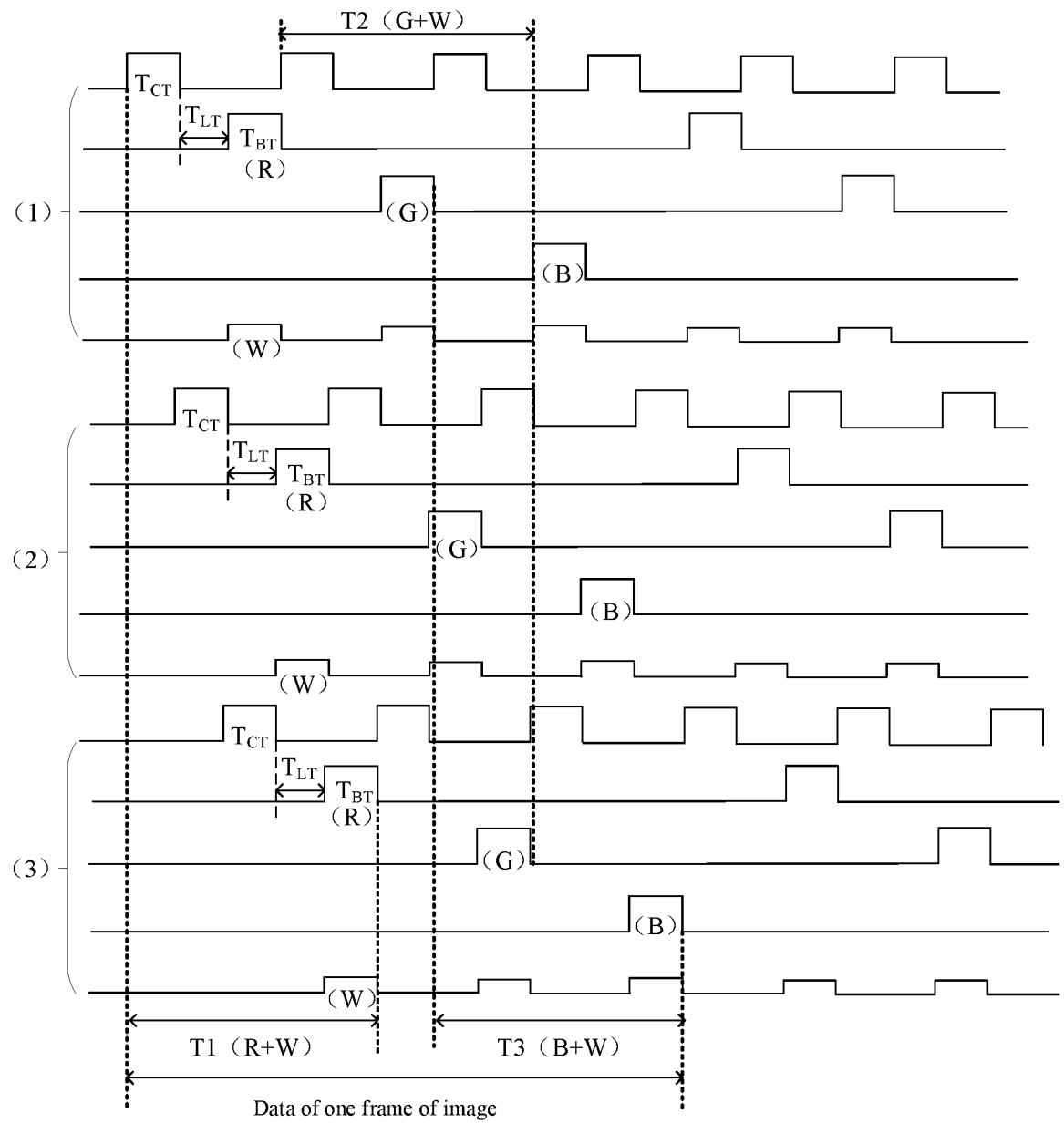
FIG. 14 is yet another driving time sequence diagram according to an embodiment of the present disclosure.

Another example is provided by taking the display module shown in FIG. 7 as an example, where the first color is red, the second color is green, the third color is blue, the fourth color is white; and in the case that the $i^{th}$ color is not white, the driving apparatus 30 is further configured to drive the white light-emitting element L1 included in each backlight source 101 to emit light in the $i^{th}$ driving process. FIG. 14 shows another driving time sequence diagram.

As shown in FIG. 14, the driving apparatus 30 may sequentially execute three driving processes T1, T2 and T3 after receiving data of one frame of image. It is assumed that the light-emitting elements L1 of the first color driven by the driving apparatus 30 in the first driving process T1 are red light-emitting elements, the light-emitting elements L1 of the second color driven by the driving apparatus 30 in the second driving process T2 are green light-emitting elements, and the light-emitting elements L1 of the third color driven by the driving apparatus 30 in the third driving process T3 is blue light-emitting elements. Referring to FIG. 14, in the first driving process T1, when driving the red light-emitting element L1 included in each backlight source 101 to emit light, the driving apparatus 30 may simultaneously drive the white light-emitting element L1 included in each backlight source 101 to emit light; in the second driving process T2, when driving the green light-emitting element L1 included in each backlight source 101 to emit light, the driving apparatus 30 may simultaneously drive the white light-emitting element L1 included in each backlight source 101 to emit light; and in the third driving process T3, when driving the blue light-emitting element L1 included in each backlight source 101 to emit light, the driving apparatus may simultaneously drive the white light-emitting element L1 included in each backlight source 101 to emit light. That is, the white color is added to the R picture, the white color is added to the G picture, and the white color is added to the B picture.

As described in the above embodiments, the luminance of the light-emitting element L1 may be positively correlated to the magnitude of a potential transmitted by the driving apparatus 30. In this way, it can be seen from FIG. 14 that in the first driving process T1, the potential transmitted by the driving apparatus 30 to the red light-emitting element L1 is greater than the potential transmitted by the driving apparatus 30 to the white light-emitting element L1. In this way, it is ensured that the luminance of the red light-emitting element L1 is higher than the luminance of the white light-emitting element L1 in the first driving process T1. The second driving process T2 and the third driving process T3 are similar to the first driving process T1, and these processes are not repeated here.

Therefore, it can be determined from the time sequence diagram shown in FIG. 14 that the display luminance Lu of one frame of image may meet the following equation:

$$Lu=(Lr+Lg+Lb)*T_{BT}+(Lwr+Lwg+Lwb)*T_{BT},$$

where Lr indicates the luminance of the red light-emitting element L1; Lwr indicates the luminance of the red light-emitting element L1 in the case that the white light-emitting element L1 is also driven to emit light when the red light-emitting element L1 is driven to emit light; Lg indicates the luminance of the green light-emitting element L1; Lwg indicates the luminance of the green light-emitting element L1 in the case that the white light-emitting element L1 is also driven to emit light when the green light-emitting element L1 is driven to emit light; Lb indicates the luminance of the blue light-emitting element L1; Lwb indicates the luminance of the blue light-emitting element L1 in the case that the white light-emitting element L1 is also driven to emit light when the blue light-emitting element L1 is driven to emit light. Therefore, it can be determined that the overall display light efficiency (i.e., luminous efficiency) can be improved by performing the driving and displaying according to the time sequence diagram shown in FIG. 14 and thus the display luminance can be effectively improved.

In addition, after the white color is added, the overall color coordinates of the white-point formed by each backlight source 101 may be: W+R+G+B, where R+G+B indicates the white-point color coordinates formed by a combination of R+G+B and may also be referred to as original white-point color coordinates. Therefore, if the coordinates of W are the same as the color coordinates formed by the combination of R+G+B, the overall coordinates of the white-point will not change; otherwise, it is necessary to change the color coordinates of the white-point according to the luminance and the coordinates of the white light-emitting element L1. Therefore, it can also be determined that as long as the W coordinates are the same as the color coordinates formed by the combination of R+G+B, the overall color coordinates of the white-point will not change regardless of whether Lwr, Lwg and Lwb are equal or not.

Figure 15:
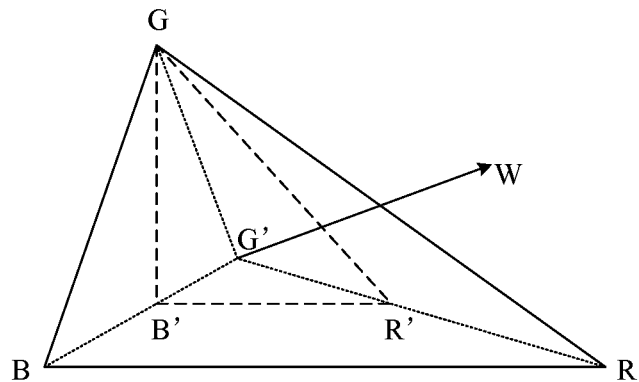
FIG. 15 is a schematic diagram of another type of color coordinates according to an embodiment of the present disclosure.

Optionally, FIG. 15 shows a schematic diagram of an optional arrangement of color coordinates of four light-emitting elements L1 included in each backlight source 101 according to the time sequence diagram as shown in FIG. 14. As can be seen from FIG. 15, when the white light-emitting element L1 is added, the color coordinates of R, G and B will be affected, but a dominant wavelength will not change. In addition, the color coordinates of R change to the extended lines of the color coordinates of W and R, and the offset is correlated with luminance.

Optionally, the display module described in the embodiments of the present disclosure may be a color-film-less head-up display (HUD) device. An HUD is a display module disposed in a vehicle, and thus may also be referred to as a vehicle-mounted HUD. The vehicle-mounted HUD is generally an augmented reality (AR)-HUD, and the AR-HUD may include picture generation units (PGU). In other words, the display module provided by the embodiments of the disclosure may be applied to the vehicle-mounted field, bringing an innovation to the vehicle-mounted field.

It should be noted that the current AR-HUD generally adopts a common conventional liquid crystal display (LCD) panel. A conventional LCD only has a transmittance of 8.5%, and the low luminance and high power consumption have become the bottleneck of its development. By adopting the color-film-less display panel provided by the embodiments of the present disclosure, not only can the transmittance of the display panel be effectively improved to about 20%, but also the display luminance can be higher and the power consumption can be lower. Optionally, the color-film-less display module described in the embodiments of the present disclosure may adopt a FOG screen, i.e., the color-film-less display module may be a FOG color-film-less display module. Compared with a FOG display module having a color film, the overall light transmittance of the color-film-less display module can be improved to about 3 times.

Figure 16:
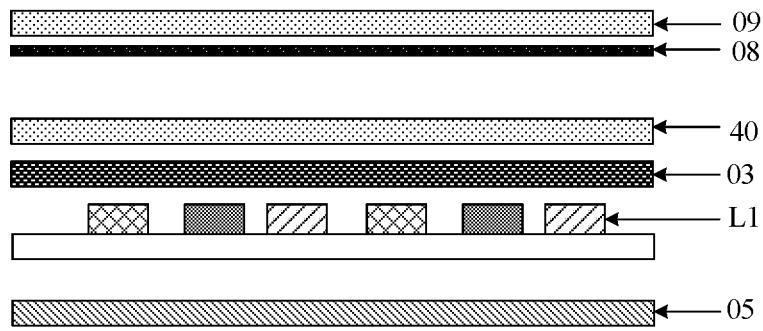
FIG. 16 is a schematic structural diagram of yet another display module according to an embodiment of the present disclosure.

FIG. 16 shows a schematic structural diagram of a FOG color-film-less display module. It can be seen by combining FIG. 11 and FIG. 16 that, in addition to the structures shown in FIG. 11, the display module may further include a gain film 08 and a FOG screen 09 that are stacked in sequence on the side of the reflective cups 40 distal from the backlight source. The gain film 08 may be made of a polarizing film material. By disposing the gain film 08, the light transmittance can be improved, unnecessary polarized light can be reflected, and heat damages of the light-emitting elements L1 to the LCD substrate can be reduced.

In some embodiments, the display module described in the embodiments of the present disclosure may also be applied to the field of other display technologies, e.g., the field of medical display technologies.

In addition, the refresh frequency of the display module described in the embodiments of the present disclosure may be 180 hertz (Hz). When the refresh frequency is high enough, human eyes will not recognize switching of different colors. Thus, changes in colors of the image can be realized by superimposing images having different gray-scales. In some embodiments, the refresh frequency may be 60 Hz.

In summary, the embodiments of the present disclosure provides a display module which includes a color backlight module, a liquid crystal display panel and a driving apparatus. The liquid crystal display panel has a plurality of display subareas arranged along a column direction, and the color backlight module has a plurality of backlight subareas in a one-to-one correspondence to the plurality of display subareas and includes a plurality of backlight sources. As the driving apparatus is configured to sequentially drive liquid crystal molecules in the display subareas to turn over, and each time the liquid crystal molecules in each display subarea have been turned over, the driving apparatus is further configured to drive the light-emitting element of one color included in each backlight source in one corresponding backlight subarea to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

Figure 17:
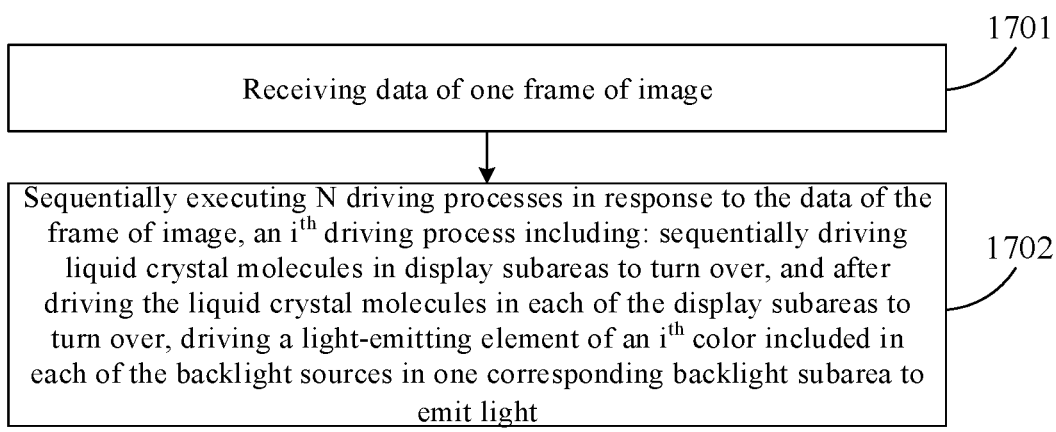
FIG. 17 is a flowchart showing a method of driving a display module according to an embodiment of the present disclosure.

FIG. 17 is a flowchart showing a method of driving a display module according to an embodiment of the present disclosure. The method may be configured to drive a display module shown in any one of FIGS. 1 to 3, 5, 8, 11 and 16. As shown in FIG. 17, the method may include the following steps.

In step 1701, data of one frame of image is received.

In step 1702, N driving processes are sequentially executed in response to the data of the frame of image, and an $i^{th}$ driving process includes: sequentially driving liquid crystal molecules in display subareas to turn over, and after driving the liquid crystal molecules in each of the display subareas to turn over, driving a light-emitting element of an $i^{th}$ color included in each backlight source in one corresponding backlight subarea to emit light.

Optionally, N may be a positive integer greater than 1, and i may be a positive integer not greater than N.

In summary, the embodiments of the present disclosure provide a method of driving a display module. In the method, liquid crystal molecules in the display subareas are sequentially driven to turn over, and each time the liquid crystal molecules in each of the display subareas have been turned over, the light-emitting element of one color included in each backlight source in one corresponding backlight subarea is further driven to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

Optionally, a reference may be made to the above descriptions about the display module for other alternative implementations of step 1702, which are not repeated here.

Figure 18:
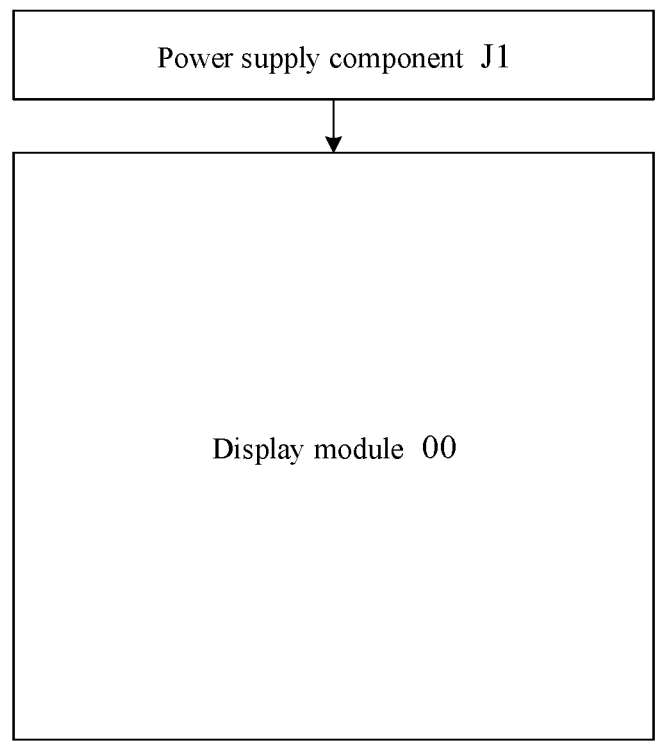
FIG. 18 is a schematic structural diagram of a display device according to an embodiment of the present disclosure.

FIG. 18 is a schematic structural diagram of a display device according to an embodiment of the present disclosure. As shown in FIG. 18, the display device may include a power supply component J1 and a display module 00 as shown in any one of FIGS. 1 to 3, 5, 8, 11 and 16.

Here, the power supply component J1 may be connected to the display module 00, and configured to power the display module 00.

It should be understood that the terms "first" and "second" in the specification and claims of the embodiments of the present disclosure, as well as the above-mentioned accompanying drawings, are used to distinguish similar objects, but not used to describe a specific sequence or precedence. It should be understood that data used in this case can be interchanged under appropriate circumstances, for example, it can be implemented in a sequence other than those given in the illustrations or descriptions of the embodiments of the present disclosure.

The above descriptions are merely optional embodiments of the present disclosure, and are not intended to limit the present disclosure. Any modifications, equivalent substitutions, improvements, and the like made within the spirits and principles of the present disclosure shall all fall within the protection scope of the present disclosure.

What is claimed is:

1. A display module, comprising:
a color backlight module and a liquid crystal display module stacked in sequence, wherein the liquid crystal display module comprises a liquid crystal display panel having a plurality of display subareas arranged along a column direction, and the color backlight module has a plurality of backlight subareas in a one-to-one correspondence to the plurality of display subareas and comprises a plurality of backlight sources located in each of the backlight subareas, each of the backlight sources comprising light-emitting elements of N colors, N being a positive integer greater than 1;
a driving apparatus connected to the color backlight module and the liquid crystal display module respectively and configured to sequentially execute N driving processes in response to receiving data of one frame of image, wherein an $i^{th}$ driving process comprises:
sequentially driving liquid crystal molecules in the display subareas to turn over, and after driving the liquid crystal molecules in each display subarea to turn over, driving a light-emitting element of an $i^{th}$ color comprised in each of the backlight sources in one backlight subarea corresponding to the display subarea as driven to emit light, i being a positive integer not greater than N; and
a plurality of reflective cups disposed between the liquid crystal display module and the color backlight module, wherein a cup bottom of each of the reflective cups is farther from the liquid crystal display module relative to a cup rim, and a size of the cup bottom is smaller than a size of the cup rim; wherein an orthographic projection of each of the reflective cups onto the liquid crystal display module overlaps with an orthographic projection of at least one of the backlight sources onto the liquid crystal display module.

2. The display module according to claim 1, wherein the driving apparatus is further configured to:
drive at least one light-emitting element of a different color than the $i^{th}$ color in each of the backlight sources to emit light in the $i^{th}$ driving process,
wherein a luminance of the light-emitting element of the $i^{th}$ color is higher than a luminance of the at least one light-emitting element of the different color.

3. The display module according to claim 1, wherein the driving apparatus is further configured to:
drive each light-emitting element of a different color than the ith color in each of the backlight sources to emit light in the ith driving process,
wherein a luminance of the light-emitting element of the ith color is higher than a luminance of each light-emitting element of the different color.

4. The display module according to claim 1, wherein each of the backlight sources comprises a light-emitting element of a first color, a light-emitting element of a second color and a light-emitting element of a third color.

5. The display module according to claim 4, wherein the three light-emitting elements in each of the backlight sources are arranged in a triangle pattern, and any two adjacent light-emitting elements in each of the backlight subareas are of different colors.

6. The display module according to claim 4, wherein each of the backlight sources further comprises a light-emitting element of a fourth color.

7. The display module according to claim 6, wherein the four light-emitting elements in each of the backlight source are arranged in a rectangle pattern, and any two adjacent light-emitting elements in each of the backlight subareas are of different colors.

8. The display module according to claim 7, wherein the first color is red, the second color is green, the third color is blue, and the fourth color is white.

9. The display module according to claim 8, wherein in a case that the ith color is not white, the driving apparatus is further configured to drive a white light-emitting element comprised in each of the backlight sources to emit light in the ith driving process.

10. The display module according to claim 1, further comprising:
- a gain film disposed on a side of the plurality of reflective cups distal from the backlight sources; and
- a fog screen disposed on a side of the gain film distal from the plurality of reflective cups.

11. The display module according to claim 1, wherein the driving apparatus comprises a processing circuit, a control circuit, a backlight driving circuit and a power supply circuit, and the liquid crystal display module further comprises a display panel driving circuit;
- the processing circuit is respectively connected to the display panel driving circuit and the control circuit, and configured to receive image data and to transmit an initial driving signal to the display panel driving circuit and the control circuit based on the image data;
- the display panel driving circuit is further connected to the liquid crystal display panel and configured to drive the liquid crystal molecules comprised in the liquid crystal display panel to turn over under a control of the initial driving signal;
- the control circuit is further connected to the backlight driving circuit and configured to transmit a backlight driving signal to the backlight driving circuit under the control of the initial driving signal;
- the backlight driving circuit is further connected to the color backlight module and configured to drive the backlight sources comprised in the color backlight module to emit light under a control of the backlight driving signal; and
- the power supply circuit is connected to the color backlight module and configured to power the color backlight module.

12. The display module according to claim 11, wherein the control circuit comprises a micro control unit MCU.

13. The display module according to claim 1, wherein the color backlight module is a direct-type backlight module.

14. The display module according to claim 1, wherein an equal number of backlight sources are provided in each of the backlight subareas.

15. The display module according to claim 1, wherein the display module is a color-film-less head-up display module.

16. The display module according to claim 1, wherein the liquid crystal display panel comprises a plurality of pixels, and a number of the plurality of pixels is greater than a number of the backlight sources comprised in the color backlight module.

17. The display module according to claim 12, wherein the driving apparatus is further configured to: drive each light-emitting element of a different color than the ith color in each of the backlight sources to emit light; a luminance of the light-emitting element of the ith color is higher than a luminance of each light-emitting element of the different color; in a case that the ith color is not white, the driving apparatus is further configured to drive a white light-emitting element comprised in each of the backlight sources to emit light in the ith driving process;
- in a case that each of the backlight sources comprises a light-emitting element of a first color, a light-emitting element of a second color and a light-emitting element of a third color, any two adjacent light-emitting elements in each of the backlight subareas are of different colors, and the three light-emitting elements in each of the backlight sources are arranged in a triangle pattern;
- in a case that each of the backlight sources further comprises a light-emitting element of a fourth color, any two adjacent light-emitting elements in each of the backlight subareas are of different colors, and the four light-emitting elements in each of the backlight sources are arranged in a rectangle pattern;
- the first color is red, the second color is green, the third color is blue and the fourth color is white;
- the display module further comprises a plurality of reflective cups disposed between the liquid crystal display module and the color backlight module, wherein a cup bottom of each of the reflective cups is farther from the liquid crystal display module relative to a cup rim, a size of the cup bottom is smaller than a size of the cup rim, an orthographic projection of each of the reflective cups onto the liquid crystal display module overlaps with an orthographic projection of at least one of the backlight sources onto the liquid crystal display module; a gain film disposed on a side of the plurality of reflective cups distal from the backlight sources; and a fog screen disposed on a side of the gain film distal from the plurality of reflective cups;
- the color backlight module is a direct-type backlight module;
- an equal number of backlight sources are provided in each of the backlight subareas;
- the display module is a color-film-less head-up display module; and
- the liquid crystal display panel comprises a plurality of pixels, and a number of the plurality of pixels is greater than a number of backlight sources comprised in the color backlight module.

18. A method of driving a display module, the display module comprising:
- a color backlight module and a liquid crystal display module stacked in sequence, wherein the liquid crystal display module comprises a liquid crystal display panel having a plurality of display subareas arranged along a column direction, and the color backlight module has a plurality of backlight subareas in a one-to-one correspondence to the plurality of display subareas and comprises a plurality of backlight sources located in each of the backlight subareas, each of the backlight sources comprising light-emitting elements of N colors, N being a positive integer greater than 1;
- a driving apparatus connected to the color backlight module and the liquid crystal display module respectively; and
- a plurality of reflective cups disposed between the liquid crystal display module and the color backlight module, wherein a cup bottom of each of the reflective cups is farther from the liquid crystal display module relative to a cup rim, and a size of the cup bottom is smaller than a size of the cup rim; wherein an orthographic projection of each of the reflective cups onto the liquid crystal display module overlaps with an orthographic projection of at least one of the backlight sources onto the liquid crystal display module, and the method comprising:
receiving data of one frame of image;
sequentially executing N driving processes in response to the data of the frame of image, wherein an ith driving process comprises:
sequentially driving liquid crystal molecules in the display subareas to turn over, and after driving the liquid crystal molecules in each display subarea to turn over, driving a light-emitting element of an ith color comprised in each of the backlight sources in one backlight subarea corresponding to the display subarea as driven to emit light, i being a positive integer not greater than N.

19. A display device, comprising: a power supply component and a display module; the power supply component is connected to the display module and configured to power the display module; and the display module comprises:
a color backlight module and a liquid crystal display module stacked in sequence, wherein the liquid crystal display module comprises a liquid crystal display panel having a plurality of display subareas arranged along a column direction, and the color backlight module has a plurality of backlight subareas in a one-to-one correspondence to the plurality of display subareas and comprises a plurality of backlight sources located in each of the backlight subareas, each of the backlight sources comprising light-emitting elements of N colors, N being a positive integer greater than 1;
a driving apparatus connected to the color backlight module and the liquid crystal display module respectively and configured to sequentially execute N driving processes in response to receiving data of one frame of image, wherein an ith driving process comprises:
sequentially driving liquid crystal molecules in the display subareas to turn over, and after driving the liquid crystal molecules in each display subarea to turn over, driving a light-emitting element of an ith color comprised in each of the backlight sources in one backlight subarea corresponding to the display subarea as driven to emit light, i being a positive integer not greater than N; and
a plurality of reflective cups disposed between the liquid crystal display module and the color backlight module, wherein a cup bottom of each of the reflective cups is farther from the liquid crystal display module relative to a cup rim, and a size of the cup bottom is smaller than a size of the cup rim; wherein an orthographic projection of each of the reflective cups onto the liquid crystal display module overlaps with an orthographic projection of at least one of the backlight sources onto the liquid crystal display module.

* * * * *